F. D. HOLDSWORTH.
METER.
APPLICATION FILED MAY 9, 1914.
1,249,626.
Patented Dec. 11, 1917.
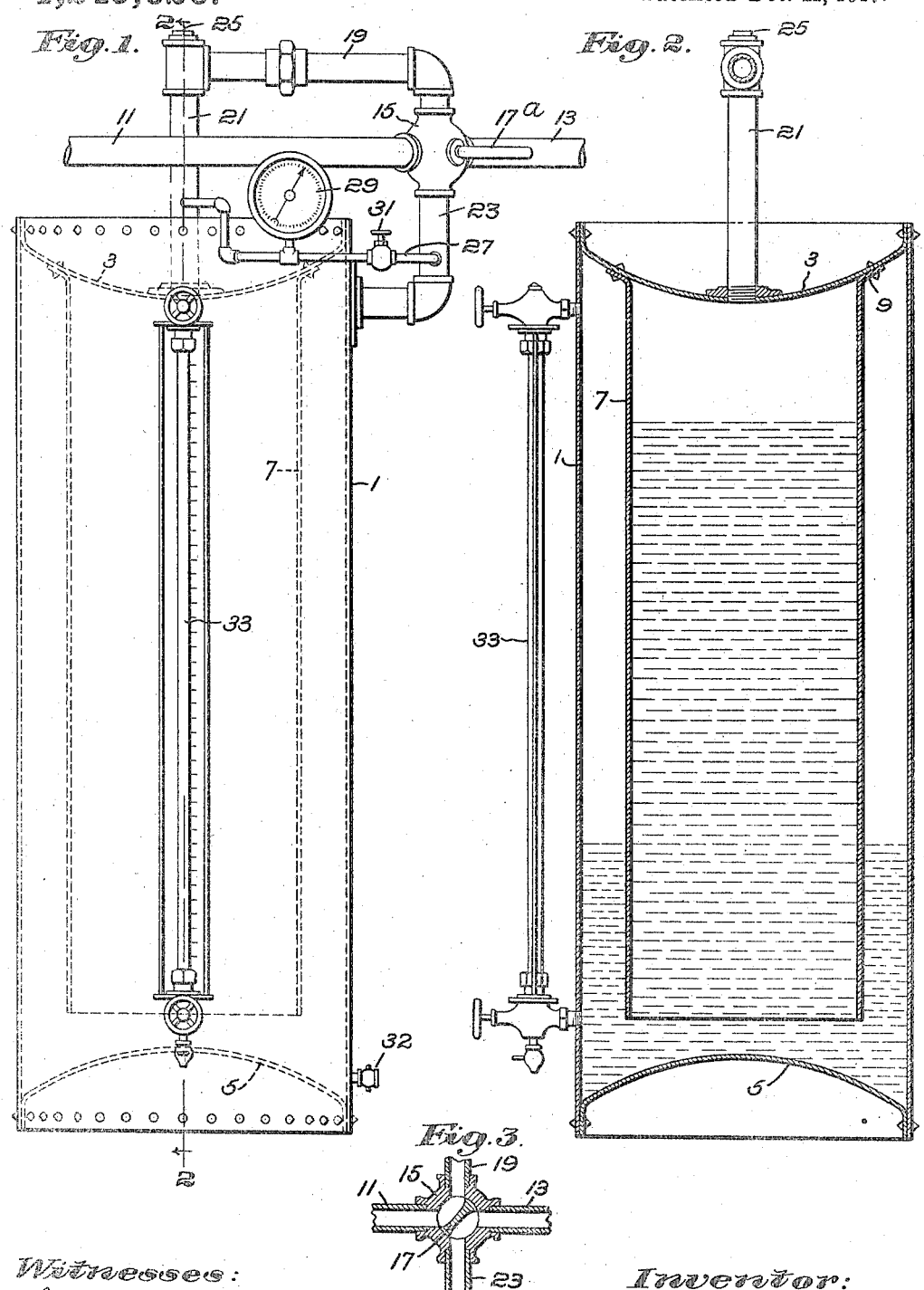
Witnesses:
Horace A. Crossman
Carl L. Choate
Inventor:
Fred D. Holdsworth.
by Emery, Booth, Janney & Varney
Attys.

UNITED STATES PATENT OFFICE.

FRED D. HOLDSWORTH, OF CLAREMONT, NEW HAMPSHIRE, ASSIGNOR TO SULLIVAN MACHINERY COMPANY, OF CLAREMONT, NEW HAMPSHIRE, A CORPORATION OF MASSACHUSETTS.

METER.

1,249,626.

Specification of Letters Patent.

Patented Dec. 11, 1917.

Application filed May 9, 1914. Serial No. 837,380.

*To all whom it may concern:*

Be it known that I, FRED D. HOLDSWORTH, a citizen of the United States, and a resident of Claremont, New Hampshire, have invented an Improvement in Meters, of which the following description, in connection with the accompanying drawings, is a specification, like characters on the drawings representing like parts.

This invention relates to pressure fluid meters, and among other objects provides a simple and effective apparatus for measuring the compressed air consumed by rock drills, coal cutters and other machinery.

The character of the invention may be best understood by reference to the following description of an illustrative embodiment thereof shown in the accompanying drawing, wherein:

Figure 1 is a vertical side elevation of an illustrative air meter shown herein as embodying the invention;

Fig. 2 is a vertical section taken on line 2—2 of Fig. 1; and

Fig. 3 is a vertical section through the valve shown in Fig. 1.

Referring to the drawing, 1 designates a tank preferably of steel and cylindrical in form, provided with an upper head 3 and a lower head 5. As shown herein the heads are bulged inward and provided with flanges contained within the tank and riveted thereto.

The space within the tank is divided into two chambers by an inner shell 7 preferably cylindrical in shape and provided at its upper end with an outwardly flaring flange 9 riveted to the upper head 3. This shell 7 depends from said head and terminates at its lower end a short distance above the lower head 5, thereby providing a sufficient space to permit a free communication to and from the inner and outer chambers. A pipe 11 leads from a source of air supply, and a pipe 13 leads to the drill or machine to be tested for air consumption. These pipes are connected by a union 15 containing a four-way valve 17 operated by a handle 17ª. This union is also connected to the inner and outer chambers of the tank; to the former by pipes 19 and 21, and to the latter by a pipe 23. The upper end of the pipe 21 is provided with a plug 25 which may be removed to permit the introduction of water into the tank. To insure equal pressures in the two chambers while introducing the water therein, there is provided a small shunt pipe 27 connecting the pipes 21 and 23 and having a gage 29 for indicating the pressure in the tank. Interposed in this small pipe 27 is a valve 31 which is opened while water is being introduced into the tank but is closed during the operation of measuring the air. To permit the water to be drawn from the tank the latter may be provided with an outlet valve 32 adjacent the lower end thereof.

To measure the amount of air passing through the tank in a given interval, there is provided a glass gage 33 connected to and communicating with the tank 1 adjacent the upper and lower ends thereof and marked with graduations representing cubic feet.

In operation the plug 25 is opened and water is introduced therethrough into the tank until its level is about midway between the ends of the scale 33. As stated, the equalizing valve 31 must be open while filling, in order to equalize the air pressure in the inner and outer chambers and insure the same water level in both. After the water has been introduced into the tank, the plug 25 and the equalizer valve 31 are closed. Then the four-way valve is turned by its handle 17ª to permit a flow of air from the supply pipe 11 through the pipes 19 and 21 into the inner chamber, and a discharge of air from the outer chamber through the pipes 23 and 13 to the machine being tested. The air admitted to the inner chamber forces the water downward therein and up in the outer chamber. From the glass gage the change in level of the water in the outer chamber can be observed and the number of cubic feet consumed in an interval of time can be readily ascertained.

After the water rises in the outer chamber nearly to the top thereof, the four-way valve may be reversed, causing air to pass from the supply pipe 11 through the pipe 23 into the outer chamber, and permitting discharge of the air from above the level of the water in the inner chamber out through the pipes 21, 19 and 13 to the machine under test. Thus by manipulation of the four-way valve the water column may be caused to reciprocate between the top and bottom zero marks on the glass scale and the test may be continued for any desired length of time.

The hydraulic air meter described is accurate, and compact, simple and strong in construction. The direction of the air supply to and from the inner and outer chambers may be readily shifted by means of the four-way valve operated by the single handle, thereby enabling the measuring operation of the apparatus to be easily continued as long as desired. The wide, open mouth formed at the lower end of the inner shell permits a ready flow of water to and from the chambers without producing waves or surges in the water which would make the gage readings unreliable.

By the employment of the nested tank construction shown, wherein the tanks are arranged one within the other, it is also possible to reduce materially the cost of the material entering into the device as compared with constructions utilizing a pair of separate tanks, the duplication of the heads, gages, etc., being rendered unnecessary. It will further be evident that by the use of the nested construction of the tanks and the balancing of the pressure on the opposite sides of the inner tank, a relatively light and cheaper grade of metal may be used, if desired, in the manufacture of that tank. In connection with my improved construction, it will also be noted that due to the nested arrangement of the tanks, the space occupied by the meter is materially less than that which is required where separate tanks are used, and that the device may be much more readily shifted from place to place when necessary. By this construction, wherein the tank 7 is carried within the tank 1 and the member 3 acts as a head for each tank, it is also possible to greatly facilitate and cheapen manufacture, as the inner tank has but a single short ring-like joint to its head and may be readily and conveniently attached thereto in an air tight manner before it is inserted in the outer tank. Thus, my improvement materially simplifies the air tight joint and reduces the length of the same heretofore necessary where a plane partition was used, and at the same time avoids all necessity for doing this difficult work from a point inside the tank. In the manufacture of this device, by attaching the inner tank to one of the heads, it is also possible to test the single air tight joint between the inner tank and its head by pouring a liquid into the inverted tank and thus insure that the same is air tight before it is inserted in the outer tank.

Having described one illustrative embodiment of the invention without limiting the same thereto, what I claim as new and desire to secure by Letters Patent is:

1. In a fluid meter, a tank having means therein dividing the same into communicating chambers one within the other, a fluid-conduit, and means connected thereto for simultaneously conducting fluid to one chamber and from the other.

2. In a fluid meter, a tank having means dividing the same into communicating chambers one within the other, a fluid conduit, means connected thereto and to each of said chambers for simultaneously conducting fluid to one chamber and from the other, and means for controlling the direction of the flow of fluid either to or from said chambers.

3. In a pressure fluid meter, tank means comprising communicating chambers one within the other, a gage for indicating the level of liquid in the outer chamber, a pressure fluid conduit, pipe means connected thereto and to each of said communicating chambers, and means for reversibly directing pressure fluid to one chamber and from the other.

4. In a pressure fluid meter, a tank having closed ends and comprising nested elements of different length and cross section opening one into the other at one end, a pressure fluid conduit, and means connected thereto for simultaneously conducting pressure fluid to one element and from the other.

5. In a pressure fluid meter, a tank comprising an outer member having a head at one end and a nested inner communicating member having a head attached to and closing the opposite end of said outer member, a pressure fluid conduit, and means connected thereto for conducting pressure fluid to one member and from the other.

6. In a pressure fluid meter, an outer tubular member, a nested inner tubular member opening into said first mentioned member, means for sealing one end of said outer member, means for sealing one end of said inner member and the other end of said outer member, a pressure fluid conduit, and means connected thereto for conducting pressure fluid to one member and from the other.

7. In a pressure fluid meter, a tank having closed ends and comprising nested coaxially disposed elements opening one into the other, at one end a pressure fluid conduit, means connected thereto for simultaneously conducting pressure fluid to one element and from the other, and means for introducing liquid through said last mentioned means simultaneously into each of said elements.

8. In a pressure fluid meter, a tank having closed ends and comprising nested coaxially disposed elements opening one into the other at one end, a pressure fluid conduit, means connected thereto for simultaneously conducting pressure fluid to one element and from the other and including piping having branches connected to each of said elements, and equalizing means between said branches.

9. In combination, a tank having a head at one end, a smaller tank nested therein having an open end disposed adjacent said head and having a head closing the other end of said first tank, a pressure fluid conduit, means connected thereto for reversibly supplying pressure fluid to one of said tanks and discharging pressure fluid from the other, and a gage for indicating the level of a liquid in one of said tanks.

10. In a pressure fluid meter, a tank means dividing the same into communicating chambers one within the other, a gage for indicating the level of liquid in one of said chambers, a pressure fluid conduit, pipes connected thereto and to each of said chambers, a valve for controlling the direction of pressure fluid movement through said pipes, an equalizer pipe connecting said pipes, and valve means for said equalizer pipe.

11. In a pressure fluid meter, a tank, means dividing the same into communicating chambers one within the other, a gage for indicating the level of liquid in one of said chambers, a pressure fluid conduit, pipes connected thereto at a common point and also connected to each of said chambers, a valved equalizer connection between said pipes, and a four-way valve disposed at the juncture of said pipes and between the points of connection of said equalizer connection for controlling the direction of flow of the pressure fluid.

12. In a pressure fluid meter, a tank having an upper and a lower head, a shell secured to said upper head and projecting downward into said tank to within a short distance from said lower head, a gage for indicating the level of liquid in one of said chambers, pressure fluid supply and discharge pipes, pipes connected thereto at a common point and to each of said chambers, a single reversible valve for controlling the direction of pressure fluid movement through said chambers, an equalizer pipe connected between said last mentioned pipes on opposite sides of said valve, and a valve in said equalizer pipe.

In testimony whereof, I have signed my name to this specification, in the presence of two subscribing witnesses.

FRED D. HOLDSWORTH.

Witnesses:
C. J. JONES,
IRENE KELLEY.

Copies of this patent may be obtained for five cents each, by addressing the "Commissioner of Patents, Washington, D. C."